United States Patent
Brown et al.

(10) Patent No.: US 8,276,357 B2
(45) Date of Patent: Oct. 2, 2012

(54) PLASTIC CHAIN GUIDE FOR A ROW UNIT

(75) Inventors: Kent Stephen Brown, Lynn Center, IL (US); Timothy Franklin Christensen, Moline, IL (US); Gregory Scott McCunn, Orion, IL (US)

(73) Assignee: Deere & Company, Moline, IL (US)

( * ) Notice: Subject to any disclaimer, the term of this patent is extended or adjusted under 35 U.S.C. 154(b) by 380 days.

(21) Appl. No.: 12/542,856

(22) Filed: Aug. 18, 2009

(65) Prior Publication Data

US 2010/0072036 A1    Mar. 25, 2010

Related U.S. Application Data

(60) Provisional application No. 61/099,551, filed on Sep. 23, 2008.

(51) Int. Cl.
*A01D 45/02* (2006.01)

(52) U.S. Cl. ............................................ 56/98; 56/119

(58) Field of Classification Search ................ 56/59, 66, 56/69, 75, 78, 82, 88, 93, 98, 106, 108, 111, 56/118, 119
See application file for complete search history.

(56) References Cited

U.S. PATENT DOCUMENTS

| | | | | |
|---|---|---|---|---|
| 3,759,021 A * | 9/1973 | Schreiner et al. | ............... | 56/106 |
| 5,060,464 A * | 10/1991 | Caron | ................ | 56/62 |
| 5,704,202 A * | 1/1998 | Calmer | ............ | 56/106 |
| 5,878,561 A * | 3/1999 | Gunn | ................ | 56/98 |
| 6,226,968 B1 * | 5/2001 | Duncan | ............ | 56/27.5 |
| 6,237,314 B1 * | 5/2001 | Boll | ................ | 56/500 |
| 7,395,651 B2 * | 7/2008 | Kost et al. | ......... | 56/119 |
| 2007/0193242 A1 | 8/2007 | Kost et al. | | |

FOREIGN PATENT DOCUMENTS

EP    0976316 A1    2/2000

OTHER PUBLICATIONS

European Search Report dated Mar. 23, 2010, (8 pages).

* cited by examiner

*Primary Examiner* — Alicia Torres (57) ABSTRACT

A unitary plastic chain guide for a row unit is provided including 2 blocks, one disposed at each end of the chain guide, and a wall extending therebetween to guide the chain.

7 Claims, 11 Drawing Sheets

PLASTIC CHAIN GUIDE FOR A ROW UNIT

RELATED APPLICATIONS

This application claims priority from U.S. Provisional Pat. App. No. 61/099,551, which was filed Sep. 23, 2008 and is incorporated herein by reference for all that it teaches.

FIELD OF THE INVENTION

The present invention relates to agricultural harvesters. More particularly it relates to corn heads for agricultural harvesters. Even more particularly, it relates to row units for corn heads.

DESCRIPTION OF THE INVENTION

Figure 1:
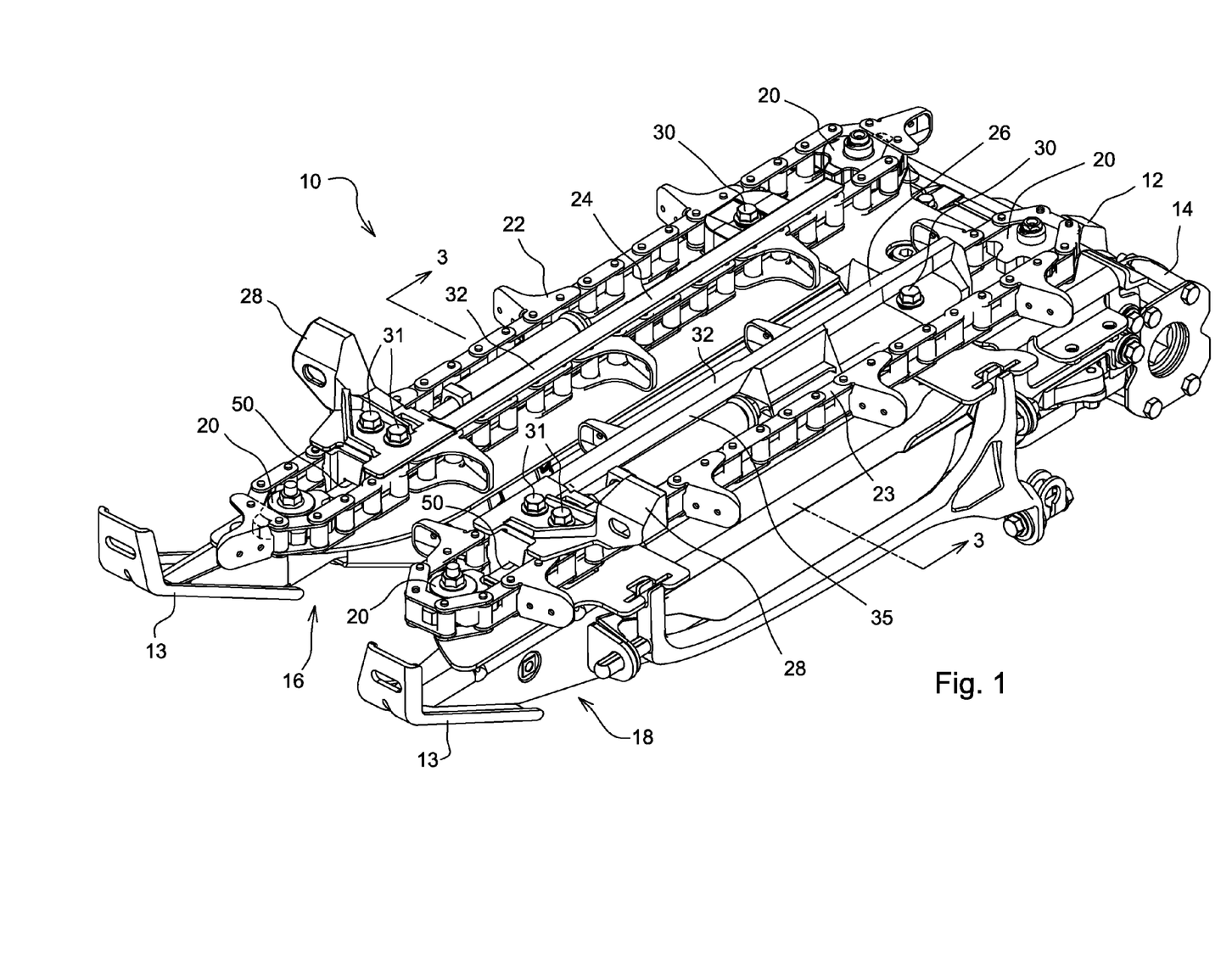
FIG. 1 is a perspective view of the inner workings of a row unit.
Figure 2:
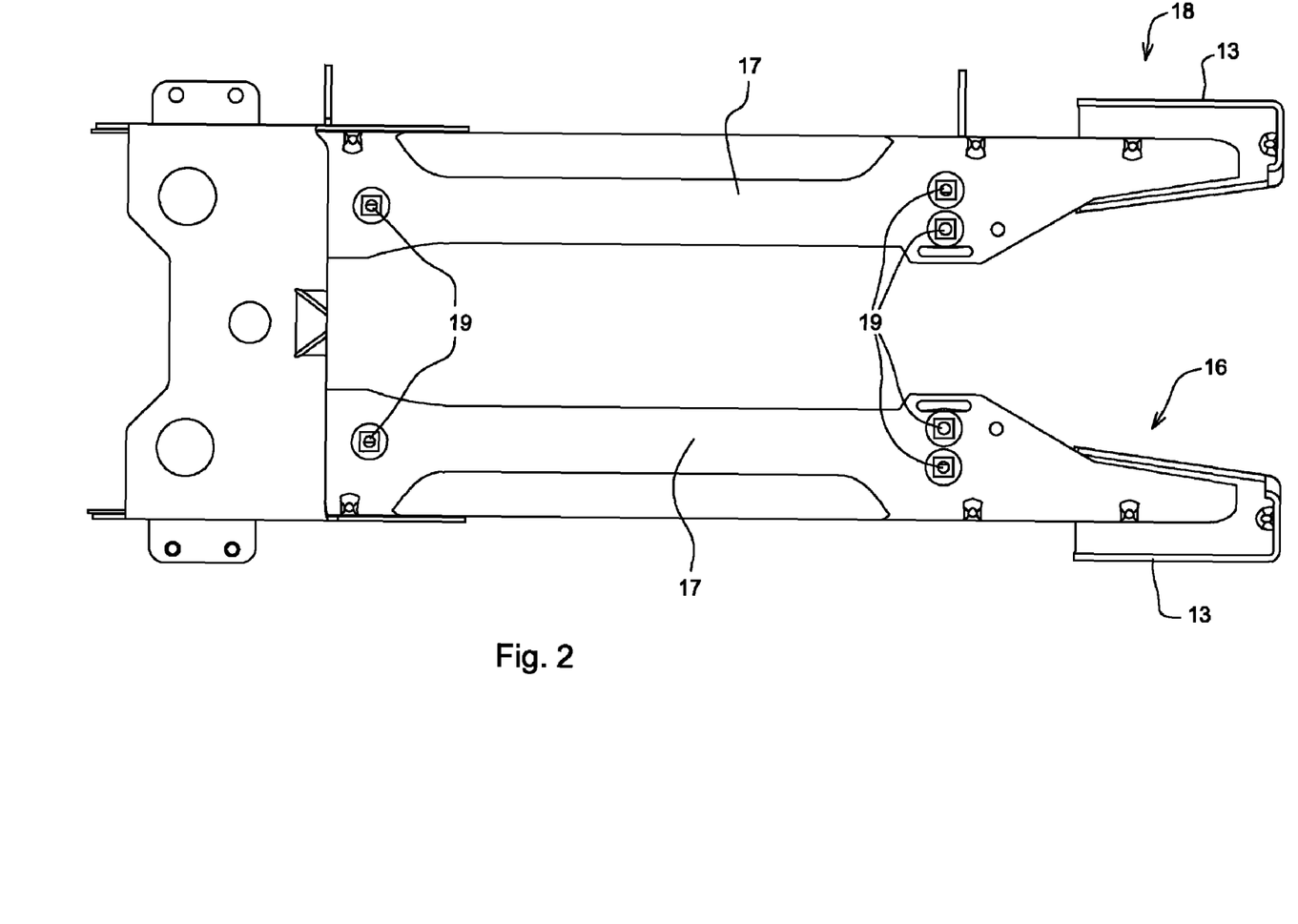
FIG. 2 is a top view of the row unit arm assembly.
Figure 3:
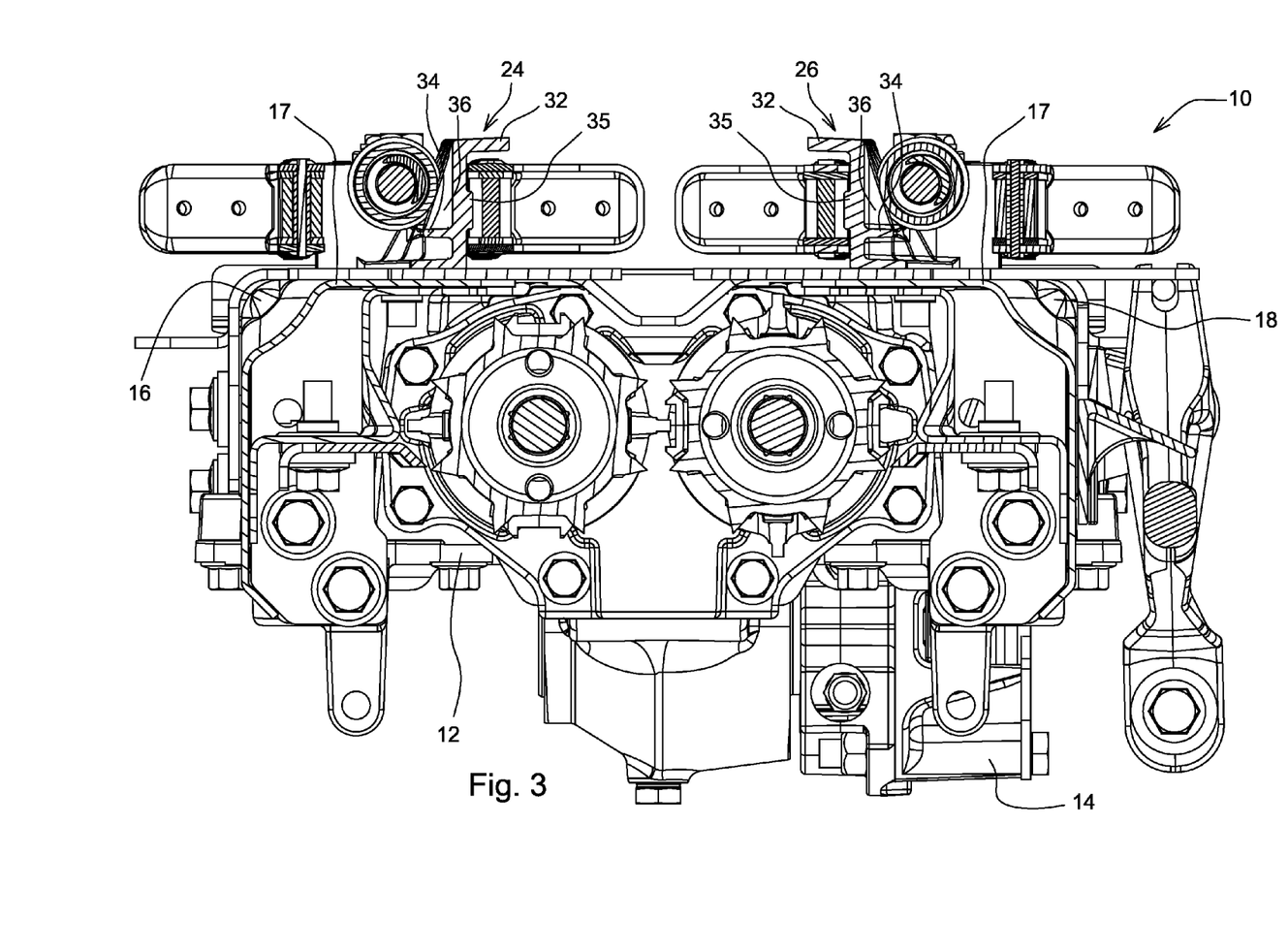
FIG. 3 is a cross sectional view of the row unit taken at section 3-3 in FIG. 1.

Referring to FIGS. 1-3, a row unit 10 for a row crop head of an agricultural harvester or combine is disclosed. Each row unit 10 includes a gearbox 12 and a clutch 14 attached to the upper parts of row unit arms 16 and 18. Gearbox 12 and clutch 14 receive power from a row unit drive shaft, not shown, and then distribute the power to driving the various elements of row unit 10. Arms 16 and 18 are substantially similar and may be a mirror image of each other, being positioned to support elements of row unit 10. A shoe 13 is attached to a forward portion of each arm 16 and 18 to protect the distal ends of arms 16 and 18 from impact and shoe 13 may additionally provide a mounting point for a cover, not shown.

The top of each row unit arm 16, 18 has a planar top surface 17 with threaded mounting holes 19 (FIG. 2) for receiving threaded fasteners that secure the chain guides to the planar top surface of the row unit arms.

Proximate to each end of arms 16 and 18 there is rotatably connected a sprocket 20, each of which have six teeth to advantageously allow for a narrower construct of each row unit 10. A gathering chain assembly 22 and a gathering chain assembly 23 are respectively positioned on arms 16 and 18. Chain assemblies 22 and 23 are driven in such a manner as the portion facing each other moves towards the top of arms 16 and 18 to assist in the ingress of the crop material.

Figure 11:
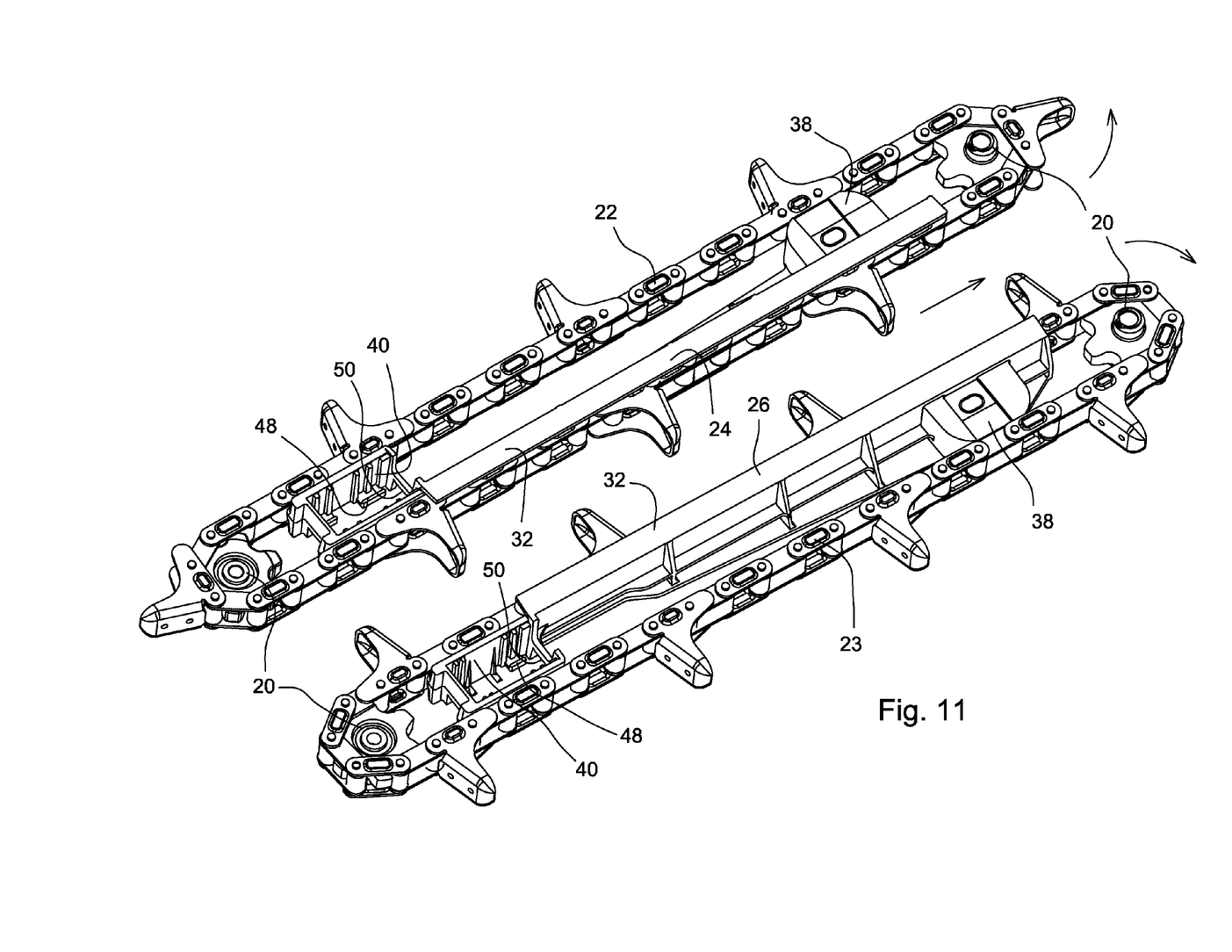
FIG. 11 is a perspective view of the gathering chain assemblies, their sprockets and the plastic chain guides in their proper orientation with the other elements removed for convenience of explanation using the same perspective as that of FIGS. 1 and 4.

Plastic guides 24 and 26 are positioned along arms 16 and 18 to accommodate, guide, and dampen oscillatory movements of chain assemblies 22 and 23 (FIGS. 1, 3, 11). Plastic guides 24 and 26 are preferably mirror images of each other. As such, the discussion of one guide is applicable to the other. Plastic guide 24 is held in position by a threaded fastener 30 proximate to the rear end of plastic guide 24. The front end of plastic guide 24 is held in position by support bracket 28, which is bolted to arm 16 with threaded fasteners 31. Support bracket 28 captivates an end of plastic guide 24 but does not provide any, or at most very little, compressive force on plastic guide 24, in a manner described in further detail below, thereby allowing some shifting in movement of the end of plastic guide 24 while holding guide 24 in position so that it can properly guide and direct chain assembly 22. Support bracket 28 also serves the function of supporting the plastic points. "Points" are also known as "row crop dividers". They extend forward, tapering to a point that faces in the direction of travel of the header. Crop approaching the header is pushed by the point to travel directly into the space between the two row unit arms. The points are lowered over the row unit to cover it in protected from the environment and rest upon the support brackets. Any impact against the points is communicated to support bracket 28 and then directly to the row unit arm, since support bracket 28 is fixed directly to the row unit arm.

Referring to FIGS. 4-11, each plastic guide 24, 26 has a shelf 32, ridges 34, a wall 35, support ribs 36, a rear block 38 and a front block 40 defining a vertically opening receptacle 44.

Wall 35 is a generally vertical and longitudinally extending wall that is disposed on the side of the gathering chain opposite the crop to support the back side of the chain and hold the chain in position adjacent to the gap between the deck plates as the chain is drawn rearward. It supports the chain during its working movement, as it travels from the front of the row unit to the rear of the row unit adjacent to gearbox 12. Wall 35 prevents the chain from being pushed outward and away from the gap between the two deck plates and away from the plant stalks it is intended to engage and draw rearward.

Each wall 35 comprises ridges 34 that extend longitudinally along the length of the wall 35. These ridges are disposed to extend toward the chain in the gap between the plates of each link of the chains. This provides support for the rollers of each chain-link. Ridges 34 provide structural support and rigidity along the length of guides 24 and 26. Ridges 34 extend along the surfaces of guides 24 and 26 to accommodate the difference in depth between links and rollers of chain assemblies 22 and 23 such that the chain is supported primarily by the rollers resting against the ridges, and not by the plates of each link dragging against (and wearing) wall 35. The height to which ridges 34 extend is selected to appropriately accommodate rollers and links of chain assemblies 22 and 23 and to ensure that the gathering chain is primarily supported by force applied to the back side of the rollers.

Shelf 32 extends generally horizontally from the top of wall 35 and is disposed over the top of the gathering chain to restrain the gathering chain from being lifted above the surface of the deck plate. Shelf 32 is substantially horizontal and extends along an upper edge of wall 35. Shelf 32 is positioned above moving chain assemblies 22 and 23. The gathering chain is prevented from moving upward off the surface of the row unit on which the guide is mounted.

Figure 4:
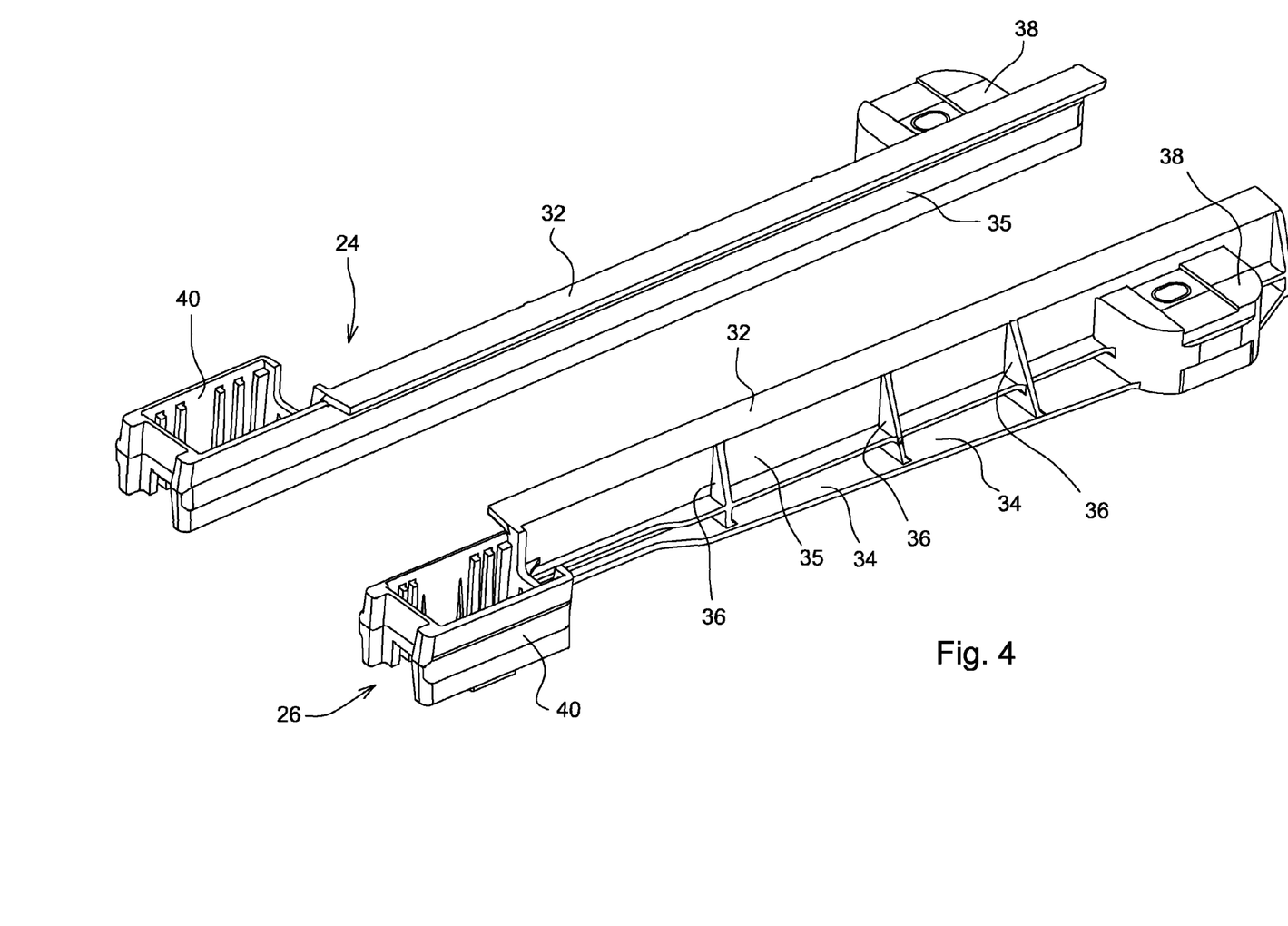
FIG. 4 illustrates the plastic chain guides from the same perspective as FIG. 1, but with the other components removed.
Figure 5:
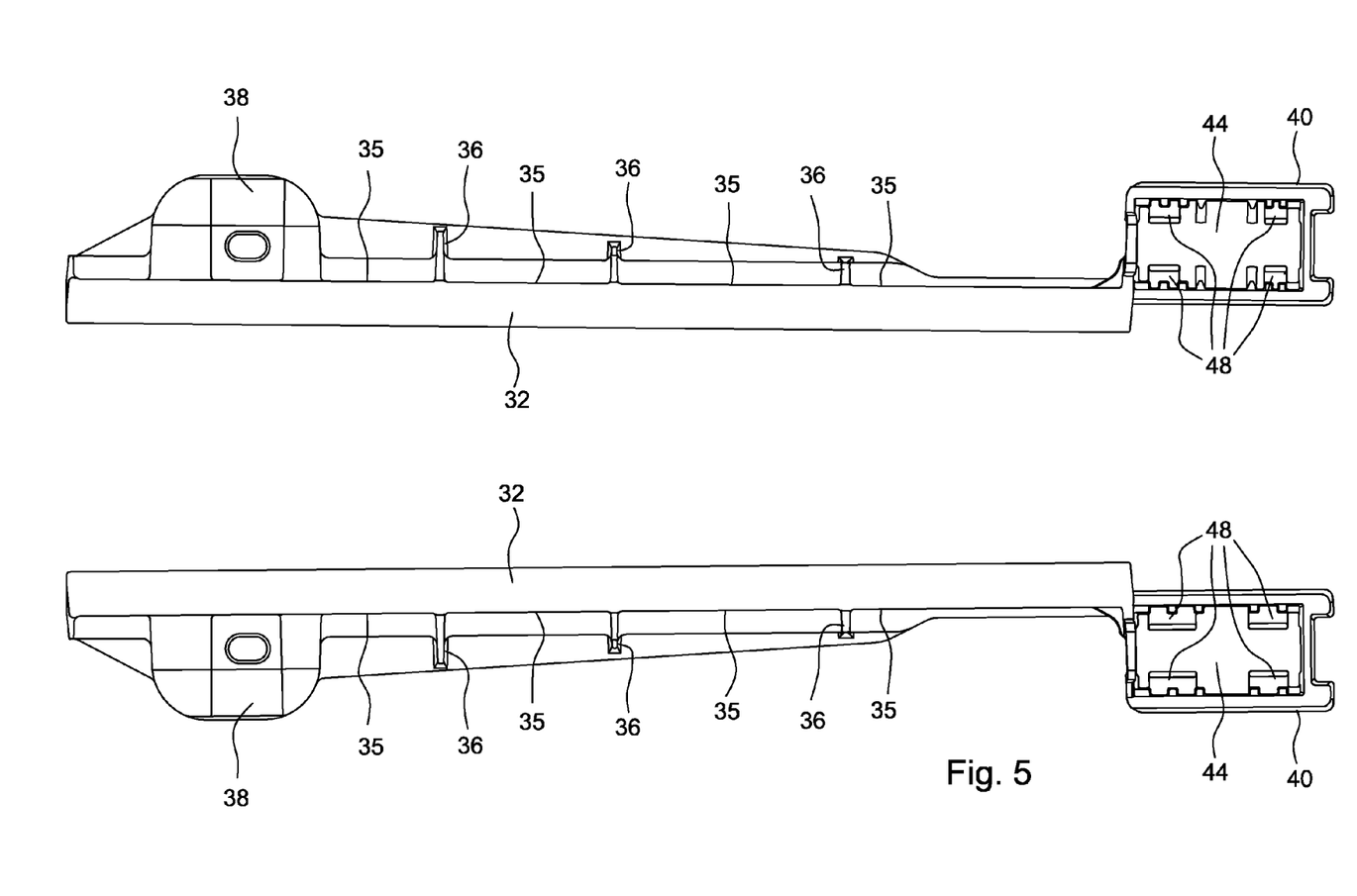
FIG. 5 is a top view of the plastic chain guides with the other components removed.
Figure 6:
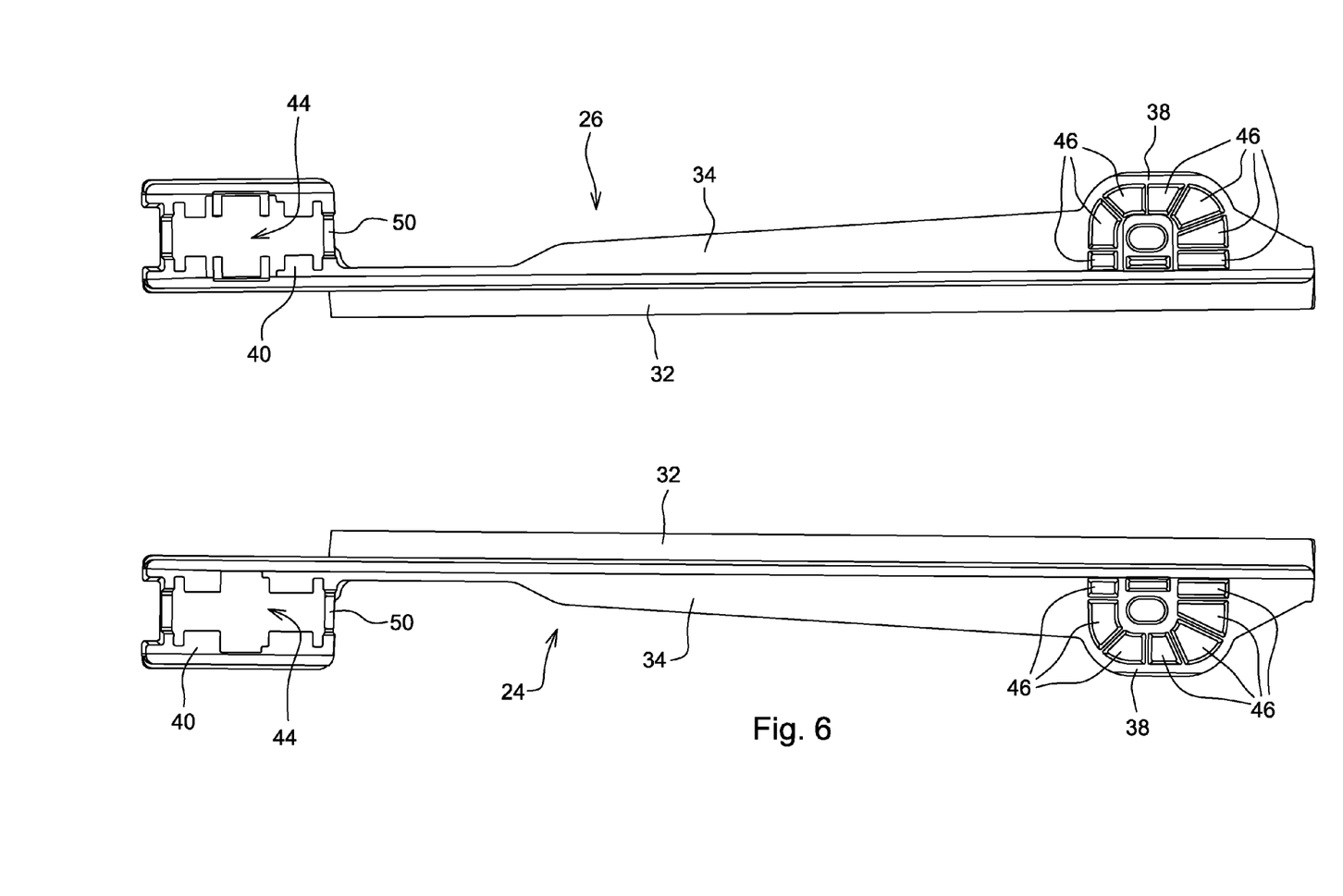
FIG. 6 is a bottom view of the plastic chain guides with the other components removed.
Figure 7:
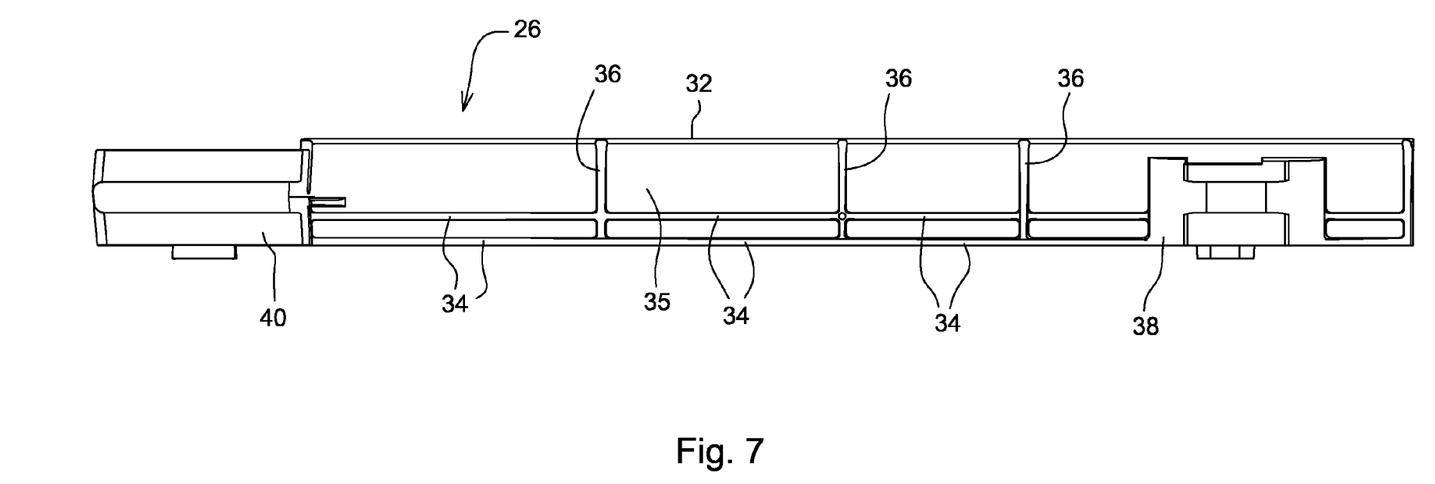
FIG. 7 is a side view of a plastic chain guide with the other components removed.
Figure 8:
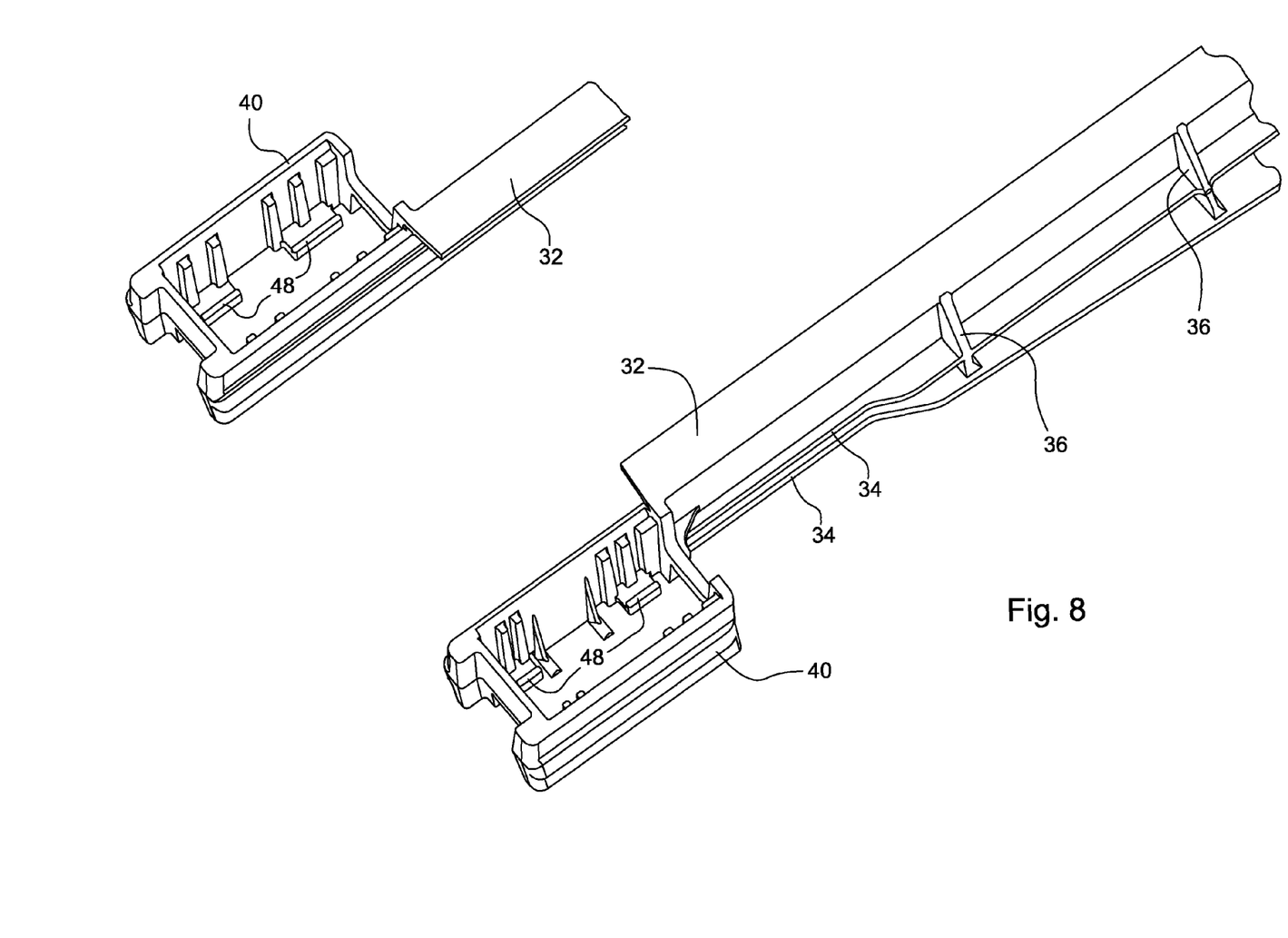
FIG. 8 is a top detailed perspective view showing just the forward portion of the plastic chain guides and particularly the elements of the receptacle of the front blocks with their constraining tabs and grooves.
Figure 9:
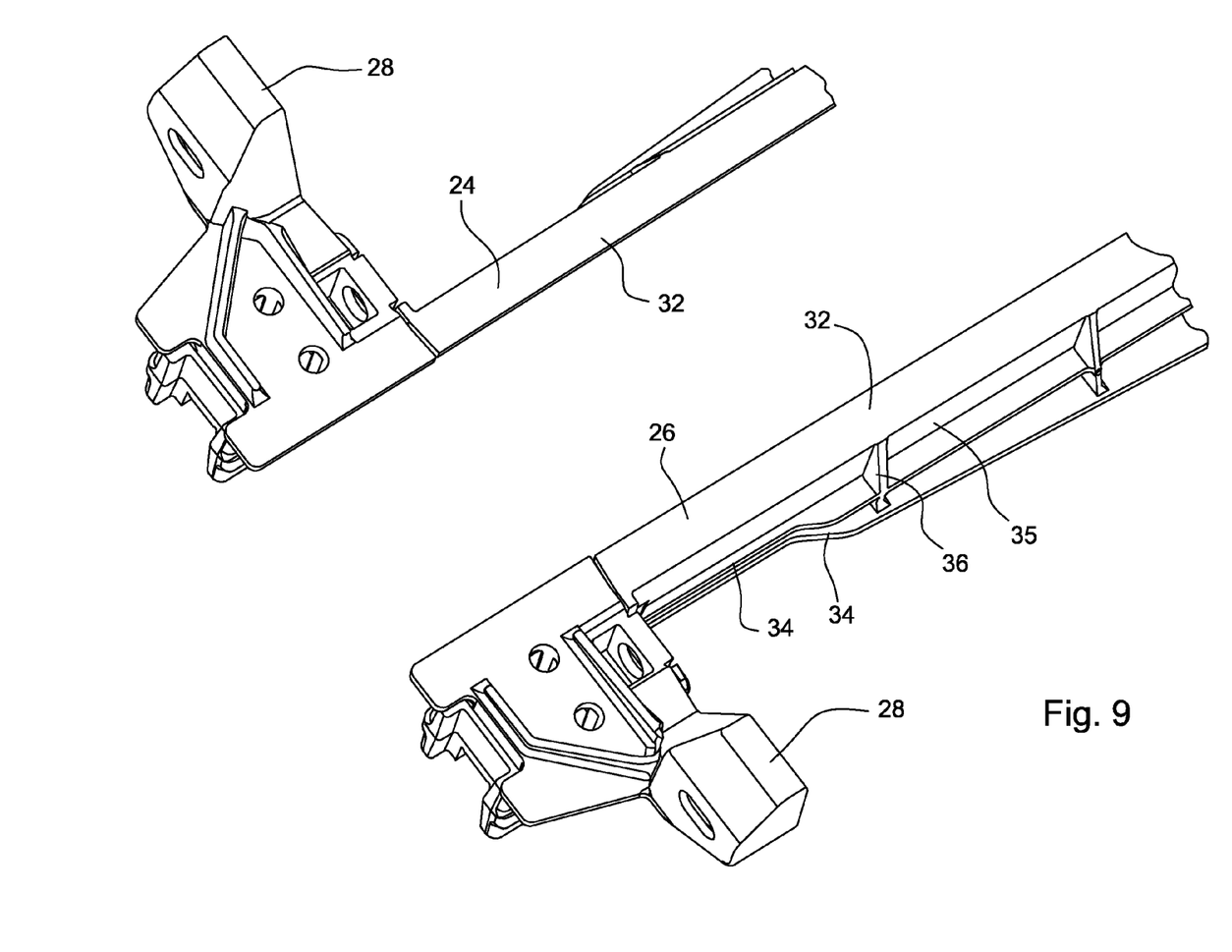
FIG. 9 is the same top detailed perspective view of FIG. 8, but with the support brackets inserted into the receptacles of the front blocks of the plastic chain guides.
Figure 10:
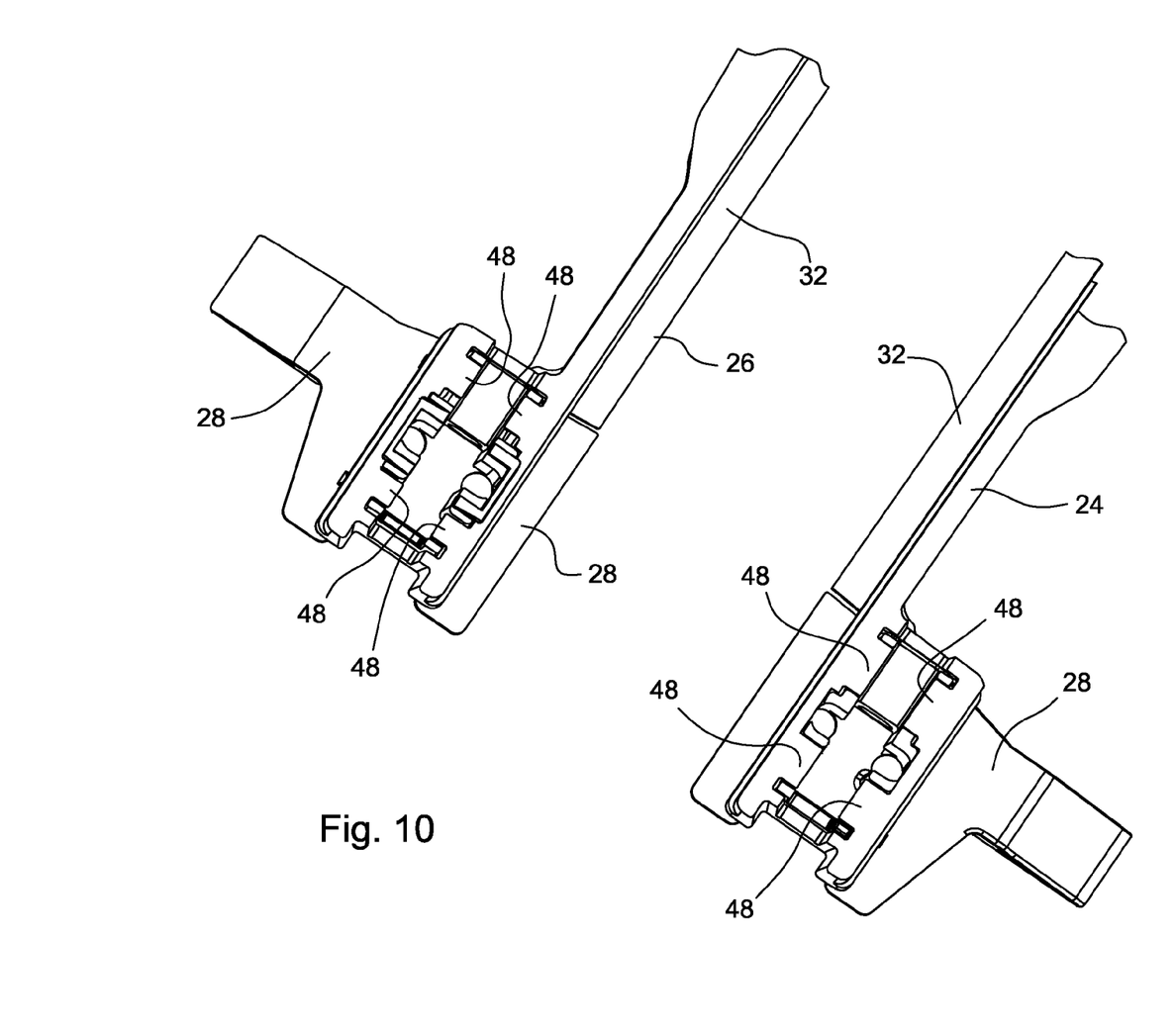
FIG. 10 is a bottom detailed perspective view of the arrangement of FIG. 9 showing the underside of the support brackets and how they engage the constraining tabs of the front blocks of the chain guides to hold the front portion of the plastic chain guides in place.

As can be seen in FIGS. 4 and 5, the rear block 38 of each of the plastic guides 24 and 26 is joined to, and extends outwardly from an outer surface region of the wall 35 at a location adjacent the rear end of the wall 35. As viewed from the top (see FIG. 5), the block 38 is generally semi-circular. The blocks 38, respectively of the guides 24 and 26, act to guide chain assemblies 22 and 23 and also to damp chain oscillations that may occur on the slack side as chain assemblies 22 and 23 move about sprockets 20. Since each of the chain assemblies 22 and 23 is driven from a rear one of the sprockets 20 such that inner runs of the assemblies travel rearward along the adjacent vertical wall 35 and outer runs travel forwardly in contact with an outer surface of the adjacent block 38, the outer runs will be on the slack side of the chain assemblies and thus will be under less tension during operation, with the result that there is a likelihood of chain oscillations. As can be seen in FIGS. 4 and 5, the blocks 38 have a closed top; and as can be seen in FIG. 6, blocks 38 include cavities 46, which are open at the bottom and sized and positioned to assist in the damping effect of block 38. The described construction of each of the blocks 38 together with its position and composition assists in dampening the chain oscillations that may even be exhibited in the form of a standing wave oscillation during operation. This advantageously reduces vibration in the system and prolongs life of chain assemblies 22 and 23. As can be seen in FIGS. 4 and 5, a forward end section of each of the vertical walls 35 defines an inside wall of the block 40, with a remaining portion of the block 40 projecting outwardly from this section of the wall 35. As viewed from the top, each block 40 is generally rectangular. Features of each support bracket 28 define a downwardly projecting insert which fits into a portion of front block 40 and particularly into receptacle 44 so that a portion of support bracket 28 attaches to arm 16 or 18, thereby positioning guides 24 and 26 in a captivated manner without compressing guides 24 and 26. Receptacle 44 has substantially angular features to accommodate support bracket 28. As can be seen looking into receptacle 44, constraining tabs 48 are positioned adjacent a lower end of the receptacle to interact with features of support bracket 28. Further, front block 40 includes a groove 50 providing for a biasing mechanism, associated with the tensioning of chain assemblies 22 and 23.

Support ribs 36 are spaced apart along the length of the guide. They are fixed to and extend outward from the side of wall 35 that faces away from the chain (i.e. the back side of wall 35). Support ribs 36 stiffen the guide. By supporting the back side of wall 35, they reduce the degree to which the guide (and particularly wall 35) flexes when the chain is pushed against wall 35.

Block 38 is fixed to the rear end of wall 35, which is the end closest to the gearbox and to the combine. Block 38 has a hole that is configured to receive a threaded fastener 30 (FIG. 1). Block 38 acts to guide chain assemblies 22 and 23 to damp chain oscillations that may occur on the slack side as chain assemblies 22 and 23 move about sprockets 20, and to anchor the rear end of the guide to the upper surface of the row unit arm.

Contact of chain assemblies 22 or 23 with block 38 on the slack side of the chain during operation with there being less tension there is a likelihood of chain oscillations. The position and composition of block 38 assists in dampening the chain oscillations that may be exhibited in the form of a standing wave oscillation during operation. This advantageously reduces vibration in the system and prolongs life of chain assemblies 22 and 23.

As FIG. 11 shows, the chain leaving sprocket 20 (located at the rear of the row unit), and headed toward sprocket 20 (located at the front of the row unit) is guided along a straight path by block 38. Block 38 is close enough to contact the slack portion of the gathering chains and prevent them from oscillating side-to-side as they travel from the rear to the front of the row unit. The directions of travel of the two gathering chains are indicated by the arrows in FIG. 11. Blocks 38 also include cavities 46, located on the underside of block 38 which may be sized and positioned to assist in the damping effect of block 38. These cavities are enclosed by the upper surface of the row unit arm on which they are mounted to substantially prevent crop material from entering the cavities.

Each front block 40 at the front of the plastic guide arms functions as a retainer to retain the forward end of the plastic chain guide to the row unit arm. The front block 40 is configured to be held in place by support bracket 28. In the preferred form shown here the receptacle 44 defined by front block 40 extends completely around a downwardly projecting insert portion of the support bracket 28.

The downwardly projecting insert portion of each support bracket 28 fits into the receptacle 44 of the associated plastic guide 24 or 26 and is fixed to the top surface of the associated row unit arm 16 or 18 with fasteners 31. This engages and retains the front block 40, thus keeping the front end of the plastic guide 24 or 26 from moving. Support brackets 28 are supported directly on the arms 16, 18 (i.e. they are fixed to the top surface of row unit arms 16, 18) thereby captivating guides 24, 26. This permits the support brackets 28 to be compressed tightly and directly against the arms. Receptacle 44 has substantially angular features to accommodate the insert portion of support bracket 28 (see e.g. FIG. 8). As can be seen looking into receptacle hole 44 in FIG. 10, constraining tabs 48 are positioned to contact and limit downward movement of the features of support bracket 28 which form the insert portion. Support bracket 28 rests upon these constraining tabs 48. Further, each front block 40 includes a groove 50 accommodating a slidebar (not numbered) shown in FIG. 1 and forming part of a biasing mechanism, associated with the tensioning of chain assemblies 22 and 23.

Plastic, guides 24, 26 are preferably made of a strong plastic with good temperature and wear characteristics, such as a glass-filled polyester. Thermosetting plastics or composites (e.g. stiffening fibers embedded in a plastic matrix) are preferred. If a thermoplastic is used, it is preferably one with a high density and good wear characteristics, such as nylon or an ultra high molecular weight polyethylene.

The invention claimed is:

1. In a row unit including first and second forwardly projecting, transversely spaced row unit arms having upper surfaces, with a fore-and-aft extending plastic chain guide being mounted to the upper surface of each row unit arm, and with an endless gathering chain being looped about front and rear sprockets carried by each row unit arm at respective locations forward and behind the chain guide, and each chain guide including an inner elongate upright wall located in guiding engagement with an inner run of the associated gathering chain, the improvement comprising:

each said chain guide including a rear block formed integral with an outer surface location of the elongate upright wall and fixed to the associated row unit arm at a location adjacent to, and directly forward of the associated rear sprocket;

a front block being formed integrally with, and having an inner side defined by, a front end section of the elongate upright wall and configured to define a vertically opening receptacle adjacent to, and rearward of the associated front sprocket; and a support bracket being releasably fixed to the associated arm and including an insert portion received in said receptacle of said front block for captivating the chain guide substantially without exerting a compressive force on the chain guide.

2. The row unit, as defined in claim 1,
wherein the support bracket includes a connecting part configured for supporting a row unit point or cover.

3. The row unit, as defined by claim 1, wherein the rear block has a surface disposed immediately adjacent an outer run of the gathering chain and abuts the chain as it follows its return path to a front one of the two sprockets.

4. The row unit, as defined by claim 1, wherein the back of the elongate plastic wall has a plurality of vertically extending plastic ribs formed integral with the elongate plastic wall and extending therefrom.

5. The row unit, as defined by claim 4, wherein the back of the elongate plastic wall has a plurality of horizontally extending plastic ridges formed integral with the elongate plastic wall and extending therefrom.

6. The row unit, as defined by claim 5, wherein the plurality of horizontally extending plastic ridges intersect the plurality of vertically extending plastic ribs.

7. The row unit, as defined by claim 1, wherein the plastic rear block has a plurality of cavities formed in the bottom surface of the plastic rear block, said cavities being enclosed by the associated row unit arm.

* * * * *